(12) United States Patent
Nolan

(10) Patent No.: US 9,545,081 B2
(45) Date of Patent: Jan. 17, 2017

(54) SCENT TRAINING DEVICE

(71) Applicant: Patrick L. Nolan, Smithsburg, MD (US)

(72) Inventor: Patrick L. Nolan, Smithsburg, MD (US)

(73) Assignee: Patrick L. Nolan, Smithsburg, MD (US)

( * ) Notice: Subject to any disclaimer, the term of this patent is extended or adjusted under 35 U.S.C. 154(b) by 123 days.

(21) Appl. No.: 14/525,991

(22) Filed: Oct. 28, 2014

(65) Prior Publication Data
US 2015/0114301 A1   Apr. 30, 2015

Related U.S. Application Data

(60) Provisional application No. 61/896,280, filed on Oct. 28, 2013.

(51) Int. Cl.
*A01K 15/02* (2006.01)
*A01K 5/01* (2006.01)

(52) U.S. Cl.
CPC .............. *A01K 15/02* (2013.01); *A01K 5/0114* (2013.01)

(58) Field of Classification Search
CPC .............................. A01K 5/0114; A01K 15/02
USPC ...... 119/417, 420, 421, 61.5, 712, 174, 905; 73/23.34; 43/124, 132.1, 138
See application file for complete search history.

(56) References Cited

U.S. PATENT DOCUMENTS

| | | | |
|---|---|---|---|
| 2,561,594 A * | 7/1951 | Pokras | A47G 19/025 220/575 |
| 6,314,911 B1 * | 11/2001 | Kaytovich | A01K 5/0114 119/61.5 |
| 7,191,560 B2 * | 3/2007 | Harris | A01M 1/02 43/107 |
| 7,207,291 B1 * | 4/2007 | Watts | A01K 5/0114 119/61.5 |
| 7,856,944 B1 * | 12/2010 | Stauffer | A01K 5/0114 119/61.5 |
| 8,776,731 B1 * | 7/2014 | Curtis | A01K 15/02 119/712 |
| 2002/0185073 A1 * | 12/2002 | Fullerton | A01K 5/01 119/51.01 |
| 2005/0224003 A1 * | 10/2005 | Yin | A01K 5/0275 119/61.5 |
| 2006/0137241 A1 * | 6/2006 | Yamasaki | A01M 1/2033 43/125 |
| 2006/0231039 A1 * | 10/2006 | Abinanti | A01K 5/0135 119/61.56 |
| 2009/0038555 A1 * | 2/2009 | Reese | A01K 15/02 119/174 |
| 2009/0044755 A1 * | 2/2009 | Volotzky | A01K 5/0135 119/61.54 |
| 2012/0132144 A1 * | 5/2012 | Parks | A01K 5/0114 119/51.5 |

(Continued)

*Primary Examiner* — Lisa Tsang
(74) *Attorney, Agent, or Firm* — Edell, Shapiro & Finnan, LLC

(57) ABSTRACT

A device for training animals such as rats, dogs, etc. to recognize and associate target odors/scents with food. The training device, sometimes referred to herein as an odor or scent training device, includes a feeding dish/pan that is configured to have food positioned therein. The scent training device creates a scent curtain of a target scent above the food so that the animal's nose and head first penetrate the scent curtain before the animal can eat the food. As such, each time the animal reaches for more food in the feeding dish, an association between the reward of food and the target scent is strengthened.

20 Claims, 8 Drawing Sheets

(56) References Cited

U.S. PATENT DOCUMENTS

2012/0210942 A1* 8/2012 Wacker .................... A01K 7/06
119/72

* cited by examiner

SCENT TRAINING DEVICE

CROSS-REFERENCE TO RELATED APPLICATIONS

The present application claims priority to U.S. Provisional Patent Application No. 61/896,280, filed on Oct. 28, 2013, the content of which is hereby incorporated by reference herein.

BACKGROUND

Field of the Invention

The present invention relates generally to an animal training device, and more particularly, to a scent training device.

Related Art

The most formative time in a dog's life is the early puppy period before the age of approximately twelve (12) weeks. However, most dog trainers do not train at this early age and instead generally wait until a dog matures. For example, detection dogs, which are dogs that are trained to use their sense of smell to detect target items (e.g., explosives, illegal drugs, certain foods, blood, etc.), are generally only scent trained after the dogs reach adulthood. Most scent training methods/approaches used for adult dogs are not suitable for early imprinting and training of puppies.

BRIEF DESCRIPTION OF THE DRAWINGS

Embodiments of the present invention are described herein in conjunction with the accompanying drawings, in which.

DETAILED DESCRIPTION

Embodiments presented herein are generally directed to a device for scent training animals such as rats, pigs, dogs, etc. to recognize and associate target odors/scents with food items (e.g., animal food, treats, etc.), simply referred to herein as "food." The training device, sometimes referred to herein as an odor or scent training device, includes a feeding dish/pan that is configured to have food positioned therein. The scent training device creates a scent "curtain" or "pool" of a target scent (i.e., target scent molecules) above the food so that the animal's nose and head must first penetrate the scent curtain before the animal can eat the food. As such, each time the animal reaches for more food in the feeding dish, an association between the reward of food and the target scent is strengthened.

The scent training device presented herein may be useful in training detection dogs to detect target scents, such as scents associated with drugs, explosives, biological substances, chemical substances, etc. The scent training device may be useful in starting the training of puppies at an early age (e.g., as early as three (3) weeks of age) or for imprinting older dogs on novel odors and for ongoing training to strengthen and maintain the target scent/reward. As described further below, the actual scent imprinting enabled by the scent training device takes place without any input from the user/operator. That is, there is no requirement for a user of the scent training device to have special animal 'training skills" or expert timing to build an association between a target scent and a reward.

For ease of illustration, the scent training device is primarily described herein with reference to the training of dogs. However, it is to be appreciated that these examples are merely illustrative and that the scent training device may also be used for the scent imprinting of a number of other animals (e.g., rats, pigs, etc.).

Figure 1:
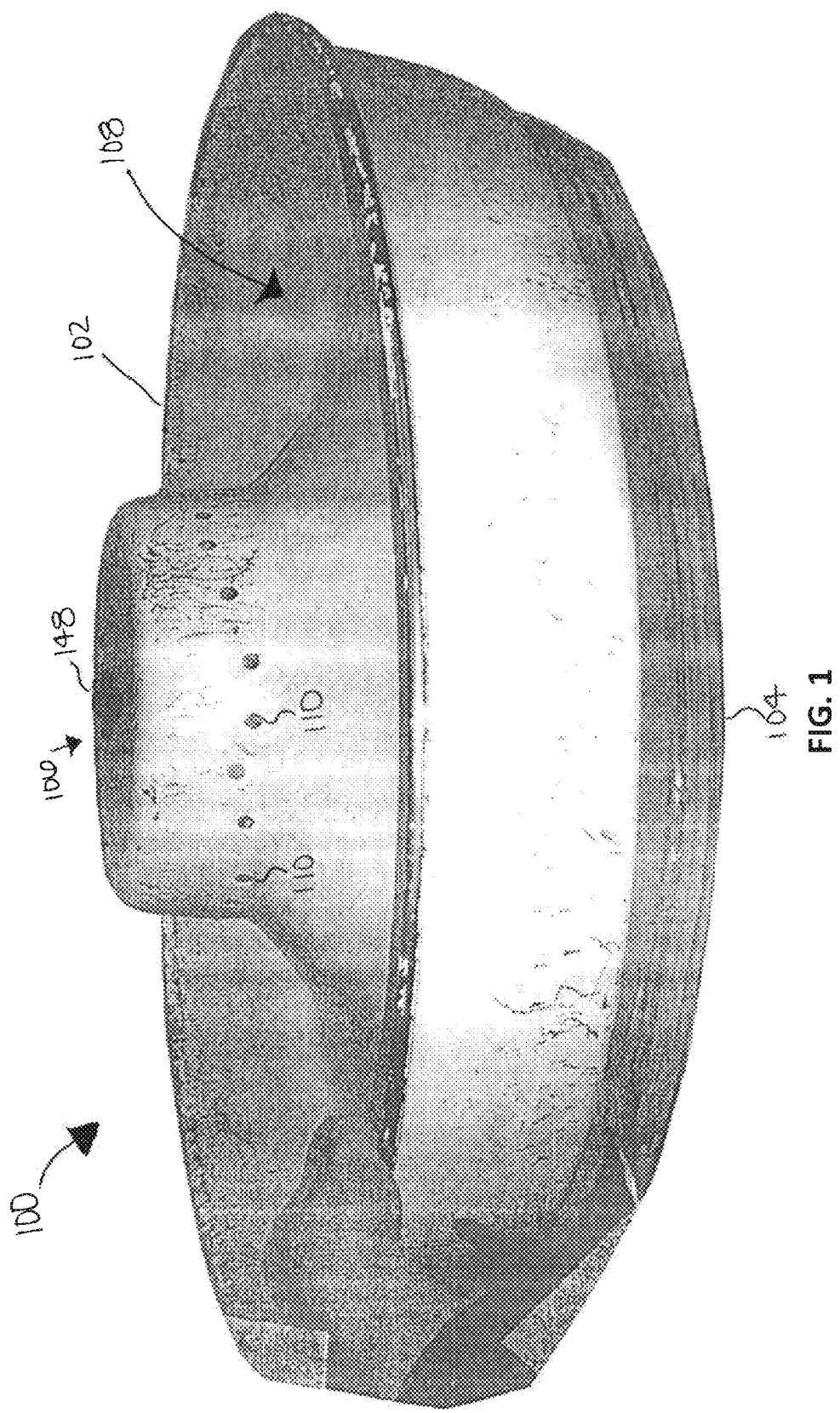
FIG. 1 illustrates a perspective view of a scent training device in accordance with embodiments presented herein.

FIG. 1 illustrates a perspective view of a scent training device 100 in accordance with embodiments presented herein. The scent training device 100 is a dog feeding station that comprises an upper section 102 that is sometimes referred to herein as feeding dish/pan 102. The scent training device 100 also includes a lower section 104 that is sometimes referred to herein as base member 104. The feeding dish 102 and base member 104 may each be formed from a number of different materials (e.g., stainless steel, plastic, etc.).

The feeding dish 102 has a generally circular shape and comprises an elevated section 107 forming an upper part of a raised central member 106. The raised central member 106 is surrounded by a feeding trough 108. Openings (apertures) 110 are disposed around the elevated section 107 and, as described further below, are used to generate a scent curtain above the trough 108.

The base member 104 has a general disc shape with a diameter that is substantially the same as the bottom diameter of feeding dish 102. As described further below, the base member 104 may be configured to detachably mate with (i.e., to be detachedly secured to) the feeding dish 102.

It is to be appreciated that the circular feeding dish 102 and disc shaped base member 104 are merely illustrative and other shapes for the feeding dish and base member are possible in alternative embodiments. For example, the feeding dish and base member may have corresponding oval, square, rectangular, or other shapes. Additionally, as described further below, in alternative embodiments the elevated section may not be a central portion, but instead may be located at a side or end of the feeding dish.

Figure 2:
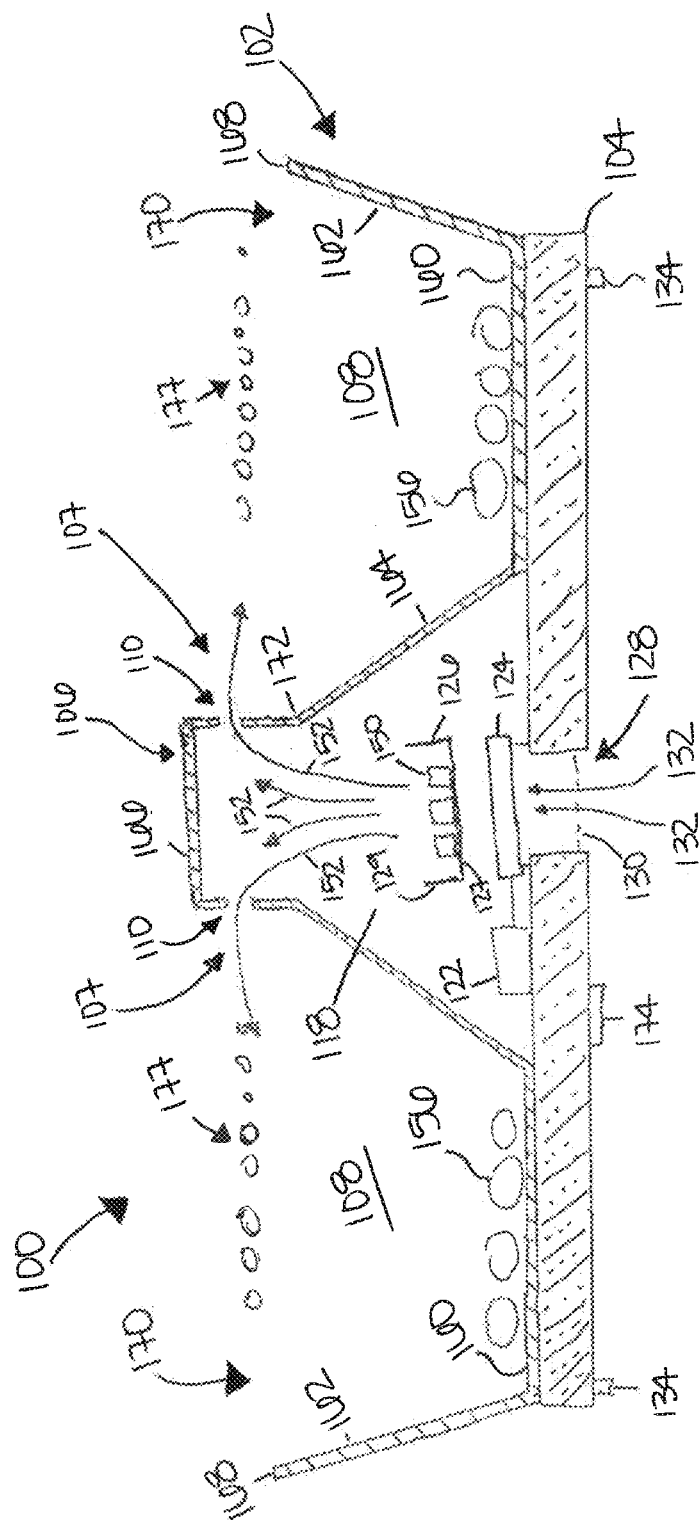
FIG. 2 illustrates a cross-sectional view of a scent training device.
Figure 3:
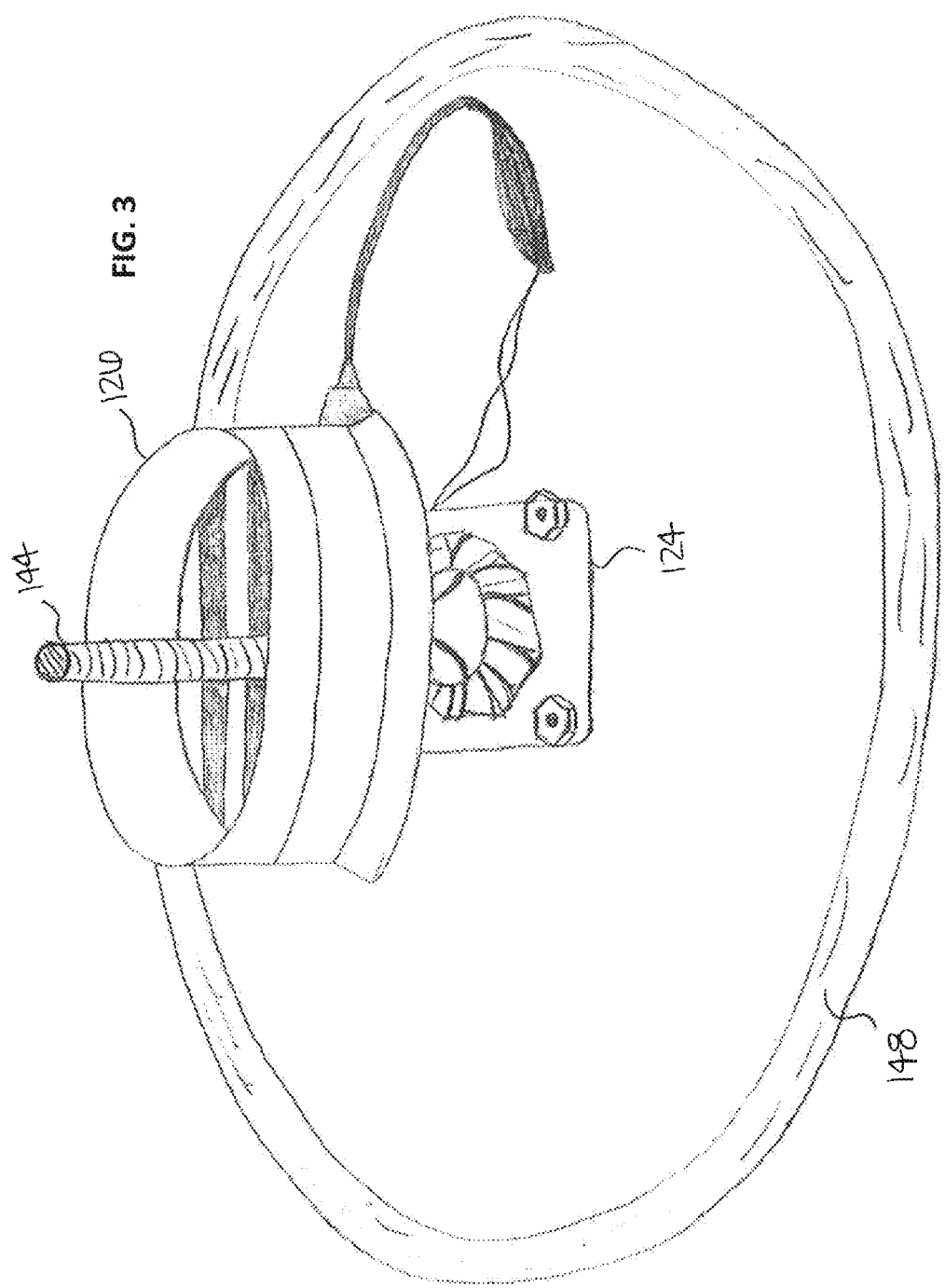
FIG. 3 illustrates a perspective view of a scent distribution module of a scent training device in accordance with embodiments presented herein.
Figure 4:
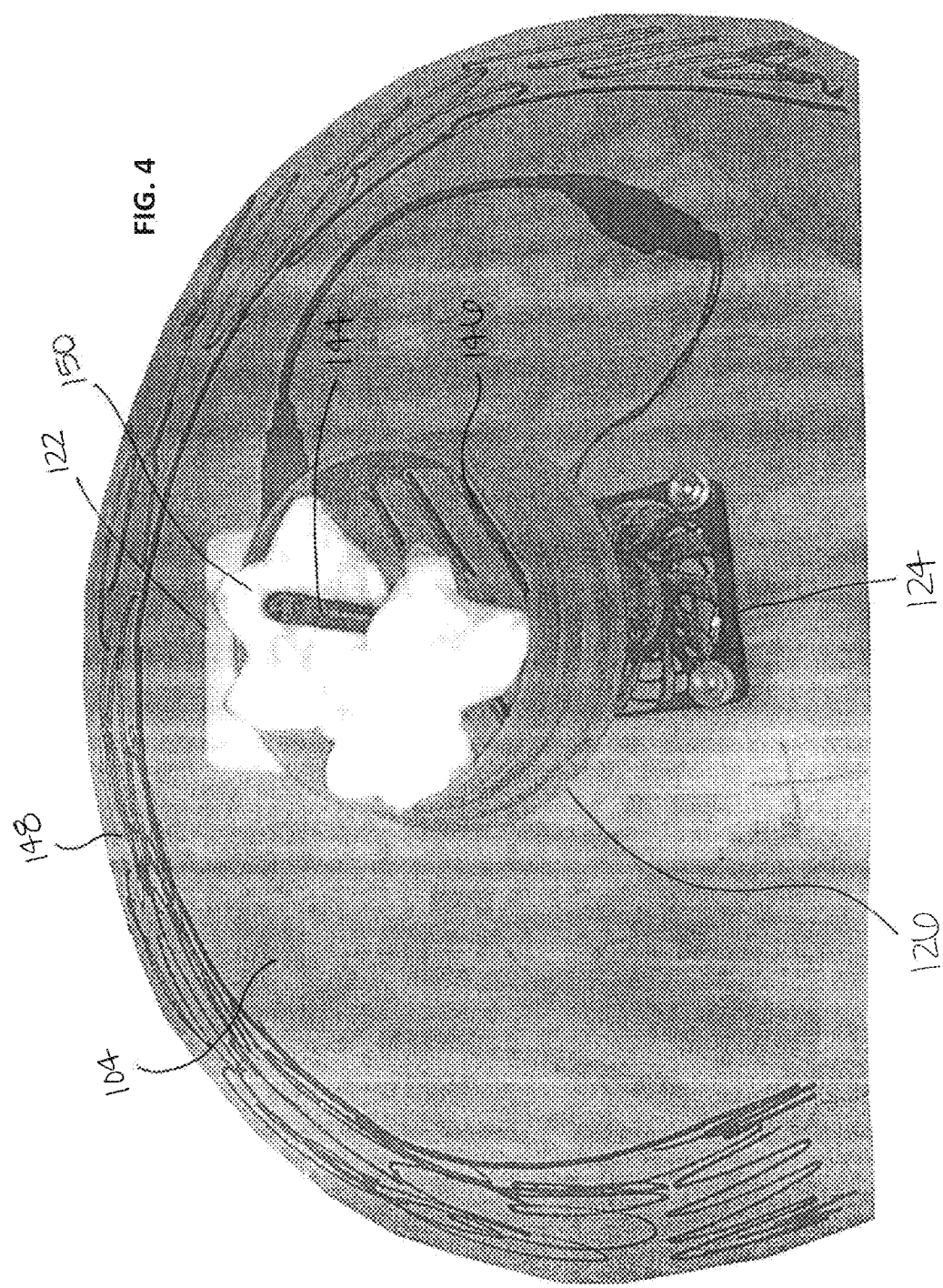
FIG. 4 illustrates a general top view of a scent distribution module in accordance with embodiments presented herein.

FIG. 2 is a cross-sectional view illustrating further details of the scent training device 100 of FIG. 1. As shown in FIG. 2, the feeding dish 102 and base member 104 collectively define a cavity or internal chamber 118 in which a scent distribution module 120 is disposed. That is, the base member 104 is configured to be positioned adjacent to the feeding dish 102 to define an internal chamber 118 between the feeding dish and the base member. FIG. 3 illustrates a perspective view of the scent distribution module 120 and a portion of base member 104, while FIG. 4 illustrates a general top view of the scent distribution module 120.

As noted above, the feeding dish 102 includes a bottom surface 160 and an outer sidewall 162. The feeding dish 102 also includes the raised central member 106 that is positioned substantially in the center of the feeding dish. The raised central member 106 is formed by an inner sidewall 164 and a top cap 166. The inner sidewall 164, bottom surface 160, and the outer sidewall 263 define the trough 108 that is configured to have a food item, such as dog food 156, positioned therein. The trough 108, which in this example has a general torus or ring shape, has sufficient dimensions (e.g., width, depth, etc.) to retain the dog food 156 and such that the openings 110 in the raised central member 106 are "above" the dog food 156. As used herein, reference to a element of the scent training device 100 as positioned "above" or "below" another element of the scent training device 100 refers to a relative position of the two elements when the scent training device 100 is in use such that the base member 104 is proximate to a support surface (e.g., the ground, floor, etc.).

As shown in FIG. 2, an outer edge or end 168 of the sidewall 162 defines the outer perimeter of an access opening 170 through which a dog may insert his/her head to reach the dog food 156 positioned in trough 108. The access opening 170 has a general torus or ring shape with an inner diameter defined by an end 172 of the inner sidewall 164.

As noted above, the scent distribution module 120 is positioned in the internal chamber 118 defined by feeding dish 102 and base member 104. In the specific example shown in FIG. 2, the internal chamber 118 is primarily positioned in raised central member 106. As described further below, other locations for an internal chamber are possible.

Figure 6:
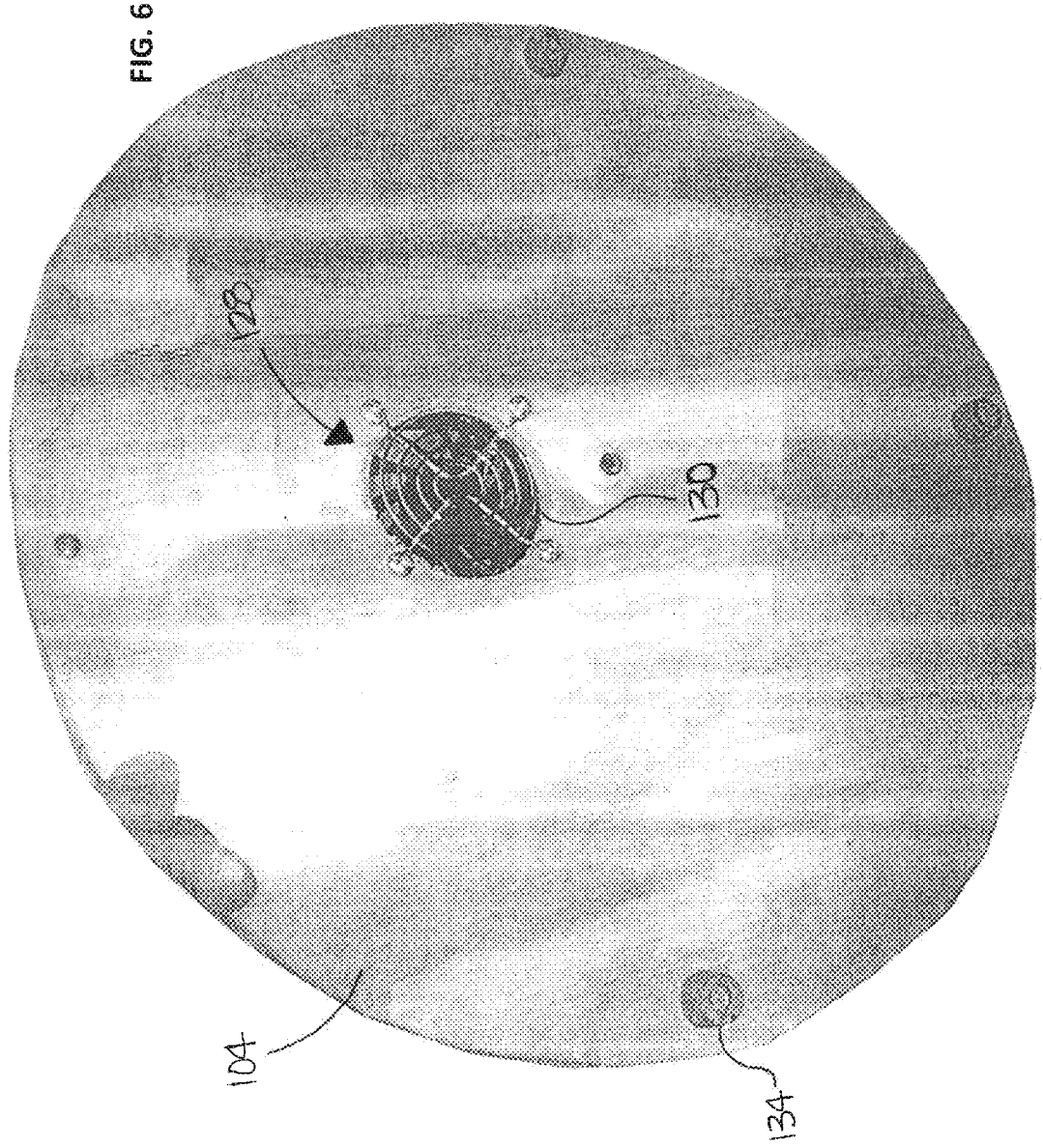
FIG. 6 illustrates a general bottom view of a scent training device in accordance with embodiments presented herein.

The scent distribution module 120 comprises a power source 122, a fan 124, and a scent tray 126. The fan 124 is mounted over an air intake opening 128 in the base member 104. A filter or screen 130 is disposed across the air intake opening 128. FIG. 6 is a general bottom view of the base member 104, illustrating the air intake opening 128 and the screen 130.

In certain embodiments, a center post (rod) 144 (shown in FIGS. 3 and 4) extends from the base member 104 to an opening (not shown) at the top of the raised central portion 106. The feeding dish 102 may be attached to the base member 102 via a nut 145 (FIG. 1) secured to the top of the center post 144. For ease of illustration, the center post 144 has been omitted from FIG. 2.

Although FIG. 2 illustrates the feeding dish 102 attached to the base member 102 via a rod 144 and nut 145, it is to be appreciated that mechanisms may be used to detachable secure the base member 104 to the feeding dish 102. Other attachment mechanisms that may be used include, for example, clips, corresponding/mating screw threads in each of base member 104 to the feeding dish 102, hook and loop (e.g., Velcro) fasteners, etc.

Figure 5:
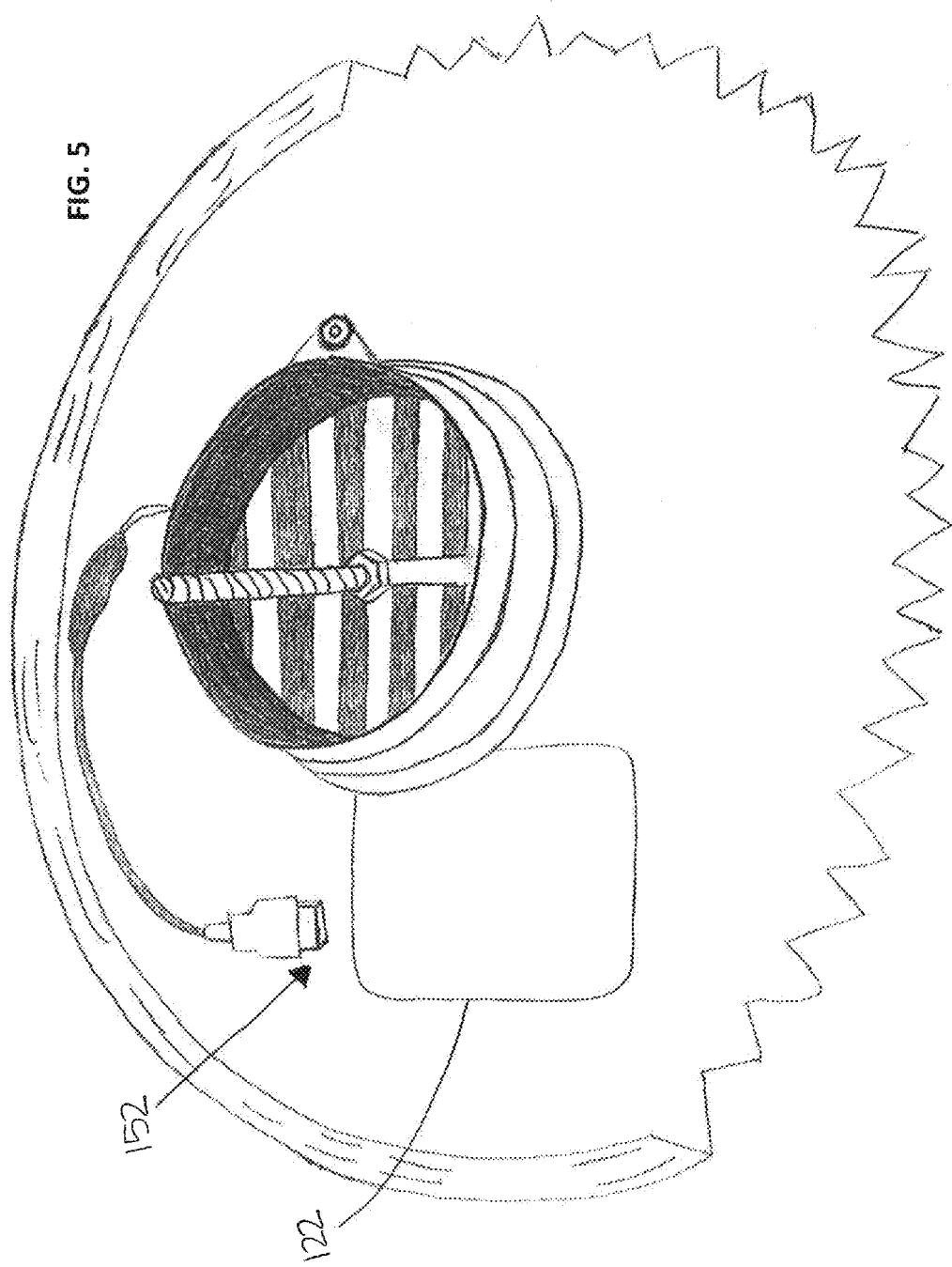
FIG. 5 illustrates a perspective view of a power source of a scent training device in accordance with embodiments presented herein.

The fan 124 may be, for example, an electric fan that is powered by the power source 122. The power source 122 may be, for example, a rechargeable and/or removable battery or battery pack. FIG. 5 illustrates a perspective view of an exemplary battery pack 122 that may be used in accordance with embodiments of the present invention. In the embodiment of FIG. 5, the battery pack 122 includes a Universal Serial Bus (USB) interface for connection to a USB connector 152 extending from the fan 124.

In alternative embodiments, the power source 122 may comprise an alternating current (AC) to direct current (DC) (AC/DC) converter connected to a power cord (not shown) so that the scent training device 100 may be connected to an AC power outlet. In further embodiments, the power source 122 may provide the ability to power the fan 124 using either rechargeable batteries/battery pack or an AC power outlet. In certain embodiments, the power source 122 may be attached to the base member 104 using, for example, a hook and loop fastener.

As shown in FIG. 3, the scent tray 126 is mounted over the fan 124 and attached to center post 144. The scent tray 126 is a ventilated tray that comprises a bottom surface 127 having a plurality of apertures 146 (shown in FIG. 4) disposed therein. The scent tray 126 may also comprise one or more side surfaces 129 so as to retain a target scent source material within the scent tray.

In operation, feeding dish 102 and base member 104 are separated (i.e., detached from one another) so that a user/operator of the scent training device 100 may place target scent source material 150 into the scent tray 126. Once the scent source material 150 is positioned into the scent tray 126, the feeding dish 102 and base member 104 may be re-attached to one another.

The target scent source material 150 may comprise any material that provides or replicates a scent that the user would like a dog to eventually learn to detect. In general, the target scent source material 150 is configured to release/emit airborne scent molecules into the vicinity of the scent tray 126. The material may be any material that gives off a target scent/odor that an animal can perceive. The target scent given off by the material may include, for example, narcotic scents, explosives scents, chemical and biological agent scents, currency scents, foodstuff scents, insect scents, cancer cell scents, etc.

The scent training device 100 may comprise an "on/off" switch 174 that, when pressed by a user, activates/deactivates the fan 124 (e.g., causes power source 122 to provide port to fan 124). Alternatively, the scent training device 100 may include a module (not shown in FIG. 2) that is configured to wirelessly communicate with a remote control (also not shown in FIG. 2) that enables a user to remotely turn the fan on/off (i.e., a wireless module responsive to remote control commands).

An illustrative location for the on/off switch 174 on the outer surface 176 of the base member 104 is shown in FIG. 2. Other locations for the on/off switch 174 are possible in other embodiments.

In general, the fan 124 is positioned in proximity to the scent tray 126 so as to force air through the scent tray and out of the internal chamber 118 through the openings 110 in the elevated section 107. More specifically, when activated (i.e., turned on), the fan 124 is configured to draw air into the internal chamber 118 through the air intake opening 128 and force the air drawn through air intake opening through the scent tray 126. The flow of air into internal chamber 118 (caused by fan 124) is shown in FIG. 2 by arrows 132. The base member 104 includes a plurality of support legs (feet) 134 that separate the base member 104 from a support surface (e.g., floor, ground, etc.) to enable the flow of air beneath the base member 104, thereby facilitating unrestricted air intake.

When the air 132 is drawn into internal chamber 118, the air will pass through the fan 124 and is forced through the scent tray 126. That is, the apertures 146 in the bottom surface 127 of the scent tray 126 allow the air 132 to pass through the scent tray. As the air 132 passes through the scent tray 126, the air is exposed to the target scent source material 150 placed in the scent tray. As a result of this exposure, the air 132 that passes through (or in the vicinity of) the scent tray 126 will begin to carry the scent molecules released by the target scent source material 150.

The air that carries the target scent (i.e., the target scent molecules) is represented in FIG. 2 by arrows 152 and is referred to herein as scented air 152. As shown in FIG. 2, the scented air 152 exits the internal chamber 118 through the openings 110 in the raised central portion 106. In certain embodiments, a seal 148 (FIGS. 3 and 4) is disposed around the perimeter of the base member 104 between the base member 104 and the feeding dish 102. This seal 148 may aid in preventing the scented air 152 from escaping from between the base member 104 and feeding dish 102, thereby facilitating the flow of the scented air 152 out of the openings 110. In certain embodiments, the fan 124 and seal 148 operate to create a pressure differential between the internal chamber 118 and the outside environment (e.g., the air in trough 108). This pressure differential may help force the scented air 152 out through the openings 110. In such embodiments, the internal chamber 118 is sometimes referred to herein as a pressurized scent chamber.

As noted above, the scented air 152 exits the internal chamber 118 through the openings 110 in raised central member 106. Also as noted above, the openings 110 are above the trough 108. When the scented air 152 exits through openings 118, the scented air creates a scent "curtain" or "pool" 177 over the food 156 at (e.g., proximate to) the access opening 170 of the feeding dish 102. That is, the scent distribution module 120 positioned in the internal chamber 118 is configured to force the scented air 152 through the openings 110 to create a distribution of scent molecules in or adjacent to the access opening 170.

A classical approach to scent training detection dogs (i.e., teaching dogs to search for target scents) is to create an association between a target scent and a reward. An element of this process is that the reward must be provided at the correct time, preferably as soon as possible after the dog detects the target scent. The association between the reward and the target scent teaches a target that, in essence, detection of the target scent will result in a reward. However, failure to provide the reward at the correct time also fails to build the association in the dog's mind between the target scent and the reward. The ability to provide a reward at the correct time requires a skilled trainer that recognizes, through body language or other cues, that a dog has detected the target scent and requires the trainer to immediately provide the reward to the dog. As such, scent training may be difficult for unskilled or novice trainers.

The scent training device 100 in accordance with embodiments presented herein advantageously creates a condition in which a dog learns to properly associate a reward with a target scent. More specifically, due to the location of the scent curtain 177 at the access opening 170 (e.g., resulting from the openings 110 in the elevated section of the feeding dish proximate to the access opening), a dog's head must first penetrate the scent curtain 177 before the dog can eat the food 156. In other words, the dog's nose passes through the scent curtain 177 so that the dog detects the target scent. Immediately after passing through the scent curtain 177, the dog reaches the food 156, which is interpreted as a reward by the dog. As such, the important timing of the reward immediately following detection of the target scent is provided by the structure of the scent training device 100. Each time the dog reaches for more food 156 in the feeding dish 102, the association between the reward of food and the target scent is strengthened.

As noted above, the actual scent training (e.g., imprinting and/or ongoing training) enabled by the scent training device 100 takes place without any input from the trainer. That is, there is no requirement for the user of the scent training device 100 to have special skills to recognize when the dog detects the target scent and immediately provide a reward so as to build the association between a target scent and a reward. Instead, the scent training device 100 exposes the dog to the target scent and the dog is immediately rewarded, thereby building the association between a target scent and a reward without action by the user.

In certain embodiments, a dog that is eating the dog food 156 will smell the scented air 152 and thus is highly exposed to the target scent. In general, the scent training device 100 ensures that the closer to the target scent that a dog is, the closer the dog is to the food source as well. Since the source of the scent is also the food source, the scent training device 100 builds a desire and habit in the dog to follow target scents to the source, which is important for detection dogs.

The scent training device 100 shown in FIGS. 1-6 may be particularly useful for performing target scent "imprinting" (i.e., training a dog to form an association between a target odor and a reward) from the age of approximately three (3) weeks on. For example, the specific shape of scent training device 100 to form a torus trough 108 may enable trainers/breeders to imprint a whole litter of puppies at the same time. Early exposure of puppies to target scents makes long lasting impressions on puppies that are resistant to fading. That is, this early scent imprinting is very deep seated, makes a lasting impression, and offers the ability to begin adult training earlier. Started early, dogs are better at finding smaller amounts of target odor substances, and can begin operational training at an earlier age, thereby extending the dog's working life span.

Figure 7:
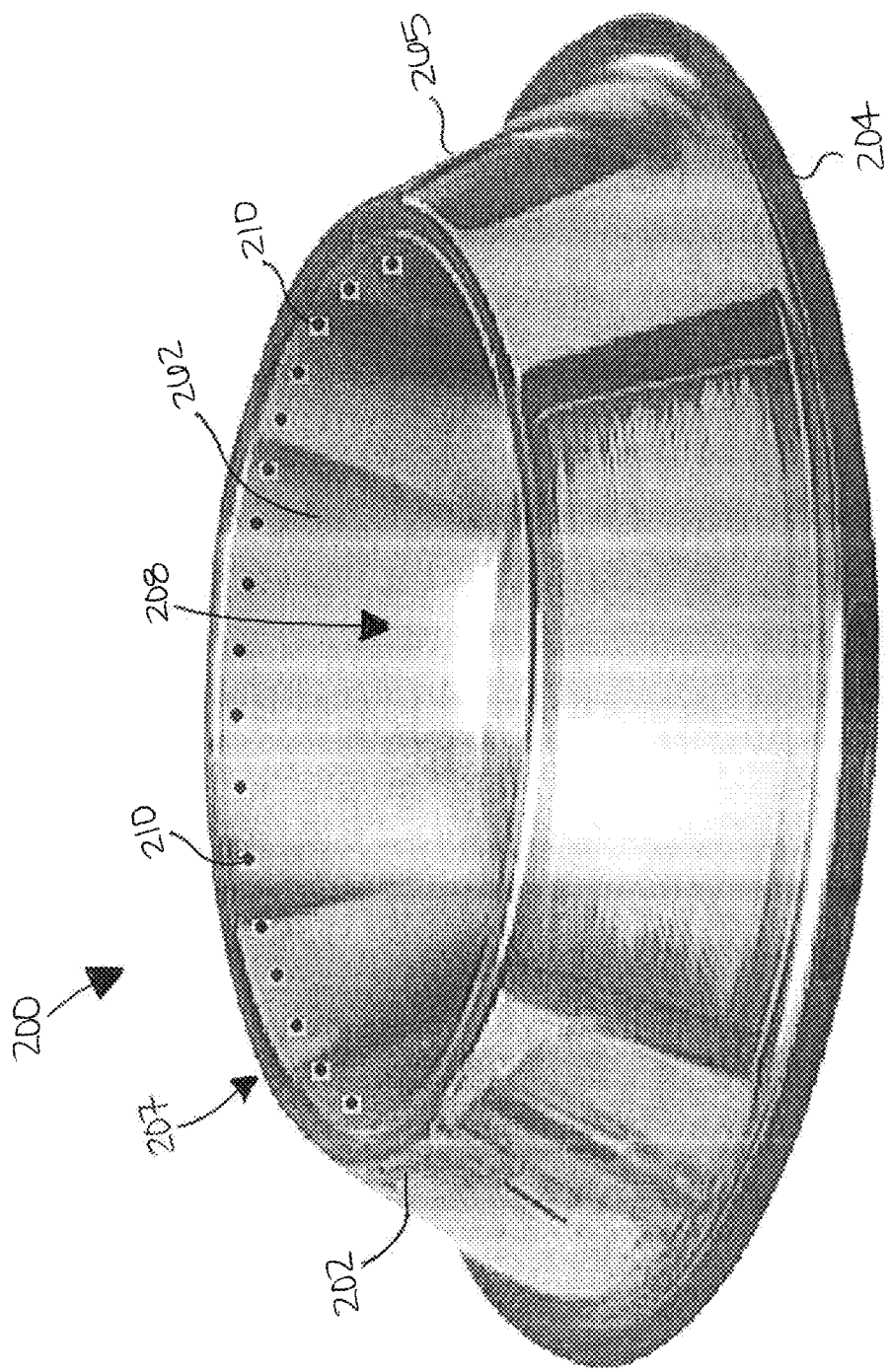
FIG. 7 illustrates a perspective view of a scent training device in accordance with embodiments presented herein.
Figure 8:
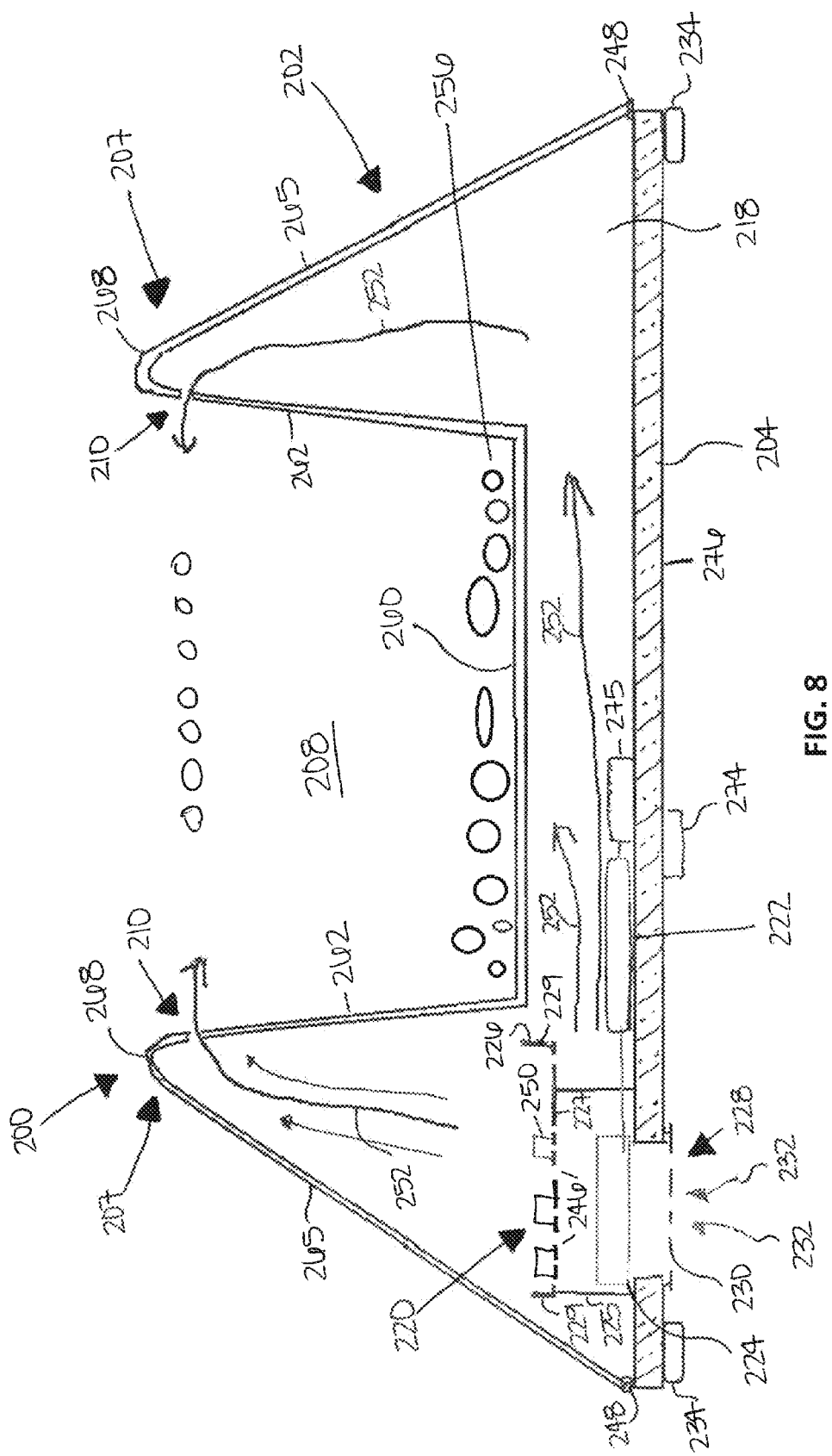
FIG. 8 illustrates a cross-sectional view of a scent training device.

FIGS. 7 and 8 are perspective and cross-sectional views, respectively, of an alternative scent training device 200 in accordance embodiments presented herein. In certain examples, the scent training device 200 may be useful for imprinting a single animal on novel odors/scents and/or for ongoing training to strengthen and maintain the target odor/reward association in trained animals, including puppy or adult dogs, pigs, rats, etc.

The scent training device 200 is an animal feeding station that comprises an upper section 202 that is sometimes referred to herein as feeding dish/pan 202. The scent training device 200 also includes a lower section 204 that is sometimes referred to herein as base member 204. The feeding dish 202 and base member 204 may each be formed from a number of different materials (e.g., stainless steel, plastic, etc.).

The feeding dish 202 includes a bottom surface 260 and an outer sidewall 262 that define a feeding trough 208 that is configured to have a food item, such as animal food 256, positioned therein. The feeding dish 202 also includes a skirt 265 that is connected to an outer edge or end 268 of the sidewall 262. An elevated section 207 of the scent training device 200 comprises a portion of the outer sidewall 262 adjacent to the end 268. Openings (apertures) 210 are disposed in the elevated section 207 and, as described further below, are used to generate a scent curtain above the trough 208.

The trough 208, which in this example has a general concave or bowl shape, has sufficient dimensions (e.g., width, depth, etc.) to retain the animal food 256 and such that the openings 210 in the elevated section 207 are "above" the animal food 256. As used herein, reference to a element of the scent training device 200 as positioned "above" or "below" another element of the scent training device 200 refers to a relative position of the two elements when the scent training device 200 is in use such that the base member 204 is proximate to a support surface (e.g., the ground, floor, etc.).

In the examples of FIGS. 7 and 8, the base member 204 has a general disc shape with a diameter that is substantially the same as the bottom diameter of feeding dish 202. The base member 204 may be configured to detachably mate with (i.e., to be detachedly secured to) the feeding dish 202 in a number of manners. For example, different clip mechanisms, mating screw threads in each piece, hook and loop fasteners, etc. may be used to attach base member 204 to feeding dish 202.

It is to be appreciated that the circular feeding dish 202 and disc shaped base member 204 are merely illustrative and other shapes for the feeding dish and base member are possible in alternative embodiments. For example, the feeding dish and base member may have corresponding oval, square, rectangular, or other shapes.

As shown in FIG. 8, the end 268 of the sidewall 262 defines the outer perimeter of an access opening 270 through which an animal may insert his/her head to reach the food 256 positioned in trough 208. The access opening 270 has a general circular shape.

The feeding dish 202 and base member 204 collectively define a cavity or internal chamber 218 in which a scent distribution module 220 is disposed. That is, the base member 204 is configured to be positioned adjacent to the feeding dish 202 to define an internal chamber 218 between the feeding dish and the base member. As shown in FIG. 8, the internal chamber 218 has an irregular shape defined by bottom surface 260, outer sidewall 262, skirt 265, and base member 204.

The scent distribution module 220 comprises a power source 222, a fan 224, and a scent tray 226. The fan 224 is mounted over an air intake opening 228 in the base member 204. A filter or screen 230 is disposed across the air intake opening 228. The fan 224 may be, for example, an electric fan that is powered by the power source 222. The power source 222 may be, for example, a rechargeable and/or removable battery or battery pack. In certain examples, the power source 222 may similar to battery pack 122 shown in FIG. 5 which uses a USB interface for connection to a USB connector extending from the fan 224.

In alternative embodiments, the power source 222 may comprise an AC/DC converter connected to a power cord (not shown) so that the scent training device 200 may be connected to an AC power outlet. In further embodiments, the power source 222 may provide the ability to power the fan 224 using either rechargeable batteries/battery pack or an AC power outlet. In certain embodiments, the power source 222 may be attached to the base member 204 using, for example, a hook and loop (e.g., Velcro) fastener.

As shown in FIG. 8, the scent tray 226 is mounted over the fan 224 using, for example, posts 225. The scent tray 226 is a ventilated tray that comprises a bottom surface 227 having a plurality of apertures 246 disposed therein. The scent tray 226 may also comprise one or more side surfaces 229 that may also include aperatures.

In operation, feeding dish 202 and base member 204 are separated (i.e., detached from one another) so that a user/operator of the scent training device 200 may place target scent source material 250 into the scent tray 226. Once the scent source material 250 is positioned into the scent tray 226, the feeding dish 202 and base member 204 may be re-attached to one another.

The target scent source material 250 may comprise any material that provides or replicates a scent that the user would like a dog to eventually learn to detect. In general, the target scent source material 250 is configured to release/emit airborne scent molecules into the vicinity of the scent tray 226. The material may be any material that gives off a scent/odor that an animal can perceive. The scent given off by the material may include, for example, narcotic scents, explosives scents, chemical and biological agent scents, currency scents, foodstuff scents, insect scents, cancer cell scents, etc.

The scent training device 200 may comprise an "on/off" switch 274 that, when pressed by a user, activates/deactivates the fan 224 (e.g., causes power source 222 to provide port to fan 224). In addition or alternatively, the scent training device 200 may include a module 275 that is configured to wirelessly communicate with a remote control (not shown in FIG. 8) that enables a user to remotely turn the fan on/off.

An illustrative location for the on/off switch 274 on the outer surface 276 of the base member 204 is shown in FIG. 8. Other locations for the on/off switch 274 and/or for module 275 are possible in other embodiments.

FIG. 8 illustrates one illustrative location for scent distribution module 220, namely substantially in an area of the internal chamber 218 defined by skirt 265 and outer sidewall 262. It is to be appreciated that this location is merely illustrative and the scent distribution module 220 may be positioned, for example, substantially below the bottom surface 260. The air intake opening 228 may accordingly be moved for positioning in proximity to the scent distribution module 220.

Returning to the example of FIG. 8, the fan 224 is positioned in proximity to the scent tray 226 so as to force air through the scent tray and out of the internal chamber 218 through the openings 210 in the elevated section 207. More specifically, when activated (i.e., turned on), the fan 224 is configured to draw air into the internal chamber 218 through the air intake opening 228 and force the air drawn through air intake opening through the scent tray 226. The flow of air into internal chamber 218 (caused by fan 224) is shown in FIG. 2 by arrows 232. The base member 204 includes a plurality of support legs (feet) 234 that separate the base member 204 from a support surface (e.g., floor, ground, etc.) to enable the flow of air beneath the base member 204, thereby facilitating unrestricted air intake.

When the air 232 is drawn into internal chamber 218, the air will pass through the fan 224 and will be forced through the scent tray 226. The apertures 246 in the bottom surface 227 of the scent tray 226 allow the air 232 to pass through the scent tray. As the air 232 passes through the scent tray 226, the air is exposed to the target scent source material 250 placed in the scent tray. As a result of this exposure, the air 232 that passes through (or in the vicinity of) the scent tray 226 will begin to carry the scent molecules released by the target scent source material 250.

The air that carries the scent molecules is represented in FIG. 8 by arrows 252 and is referred to herein as scented air 252. As shown, the scented air 252 exits the internal chamber 218 through the openings 210 in the elevated section 207. In certain embodiments, a seal 248 is disposed around the perimeter of the base member 204 between the base member 204 and the feeding dish 202. This seal 248 may aid in preventing the scented air 252 from escaping from between the base member 204 and feeding dish 202, thereby facilitating the flow of the scented air 252 out of the openings 210. In certain embodiments, the fan 224 and seal 248 operate to create a pressure differential between the internal chamber 218 and the outside environment (e.g., the air in trough 208). This pressure differential may help force the scented air 252 out through the openings 210. In such embodiments, the internal chamber 218 is sometimes referred to herein as a pressurized scent chamber.

As noted above, the scented air 252 exits the internal chamber 218 through the openings 210 in elevated section 207. Also as noted above, the openings 210 are above the trough 208. When the scented air 252 exits through openings 218, the scented air creates a scent curtain 277 over the food 256 at (e.g., proximate to) the access opening 270 of the feeding dish 202. That is, the scent distribution module 220 positioned in the internal chamber 218 is configured to force the scented air 252 through the openings 210 to create a distribution of scent molecules in or adjacent to the access opening 270.

As noted above, a classical approach to scent training detection dogs or other animals is to create an association between a target scent and a reward by rewarding the animal as soon as possible after the animal detects the target scent. The scent training device 200 in accordance with embodiments presented herein advantageously creates a condition in which an animal is timely rewarded after exposure to a target scent. More specifically, due to the location of the scent curtain 277 at the access opening 270 (e.g., resulting from the openings 210 in the elevated section 207 of the feeding dish proximate to the access opening), an animal's head must first penetrate the scent curtain 277 before the animal can eat the food 256. In other words, the animal's nose passes through the scent curtain 277 so that the animal detects the target scent. Immediately after passing through the scent curtain 277, the animal reaches the food 256, which is interpreted as a reward by the animal. As such, the important timing of the reward immediately following detection of the target scent is provided by the structure of the scent training device 200. Each time the animal reaches for more food 256 in the feeding dish 202, the association between the reward of food and the target scent is strengthened.

The actual scent training (e.g., imprinting and/or ongoing training) enabled by the scent training device 200 takes place without any input from the trainer. That is, there is no requirement for the user of the scent training device 200 to have special skills to recognize when the animal detects the target scent and immediately provide a reward so as to build the association between a target scent and a reward. Instead, the scent training device 200 exposes the animal to the target scent and the animal is immediately rewarded, thereby building the association between a target scent and a reward without action by the user.

In certain embodiments, a dog that is eating the dog food 256 will smell the scented air 252 and thus is highly exposed to the target scent. In general, the scent training device 200 ensures that the closer to the target scent that a dog is, the closer the dog is to the food source as well. Since the source of the scent is also the food source, the scent training device 200 builds a desire and habit in the dog to follow target scents to the source, which is important for detection dogs.

As noted, the specific training examples provided above are merely illustrative. The scent training device in accordance with embodiments presented herein may be modified to train dogs, rats, pigs and/or other animals for target scent identification. Additionally, scent training devices in accordance with embodiments presented herein may have different shapes (e.g., rectangular, square, oval, etc.) and sizes. As such, the invention described and claimed herein is not to be limited in scope by the specific embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A scent training device, comprising:
   a feeding dish having a bottom surface and at least an outer sidewall defining a trough in which a food item can be disposed, wherein the outer sidewall defines an access opening of the feeding dish;
   a base member positioned below the feeding dish to define an internal chamber between the feeding dish and the base member;
   an elevated section comprising a substantially vertical surface extending above the trough and including one or more openings extending through the substantially vertical surface from the internal chamber to the feeding dish at a location adjacent the access opening; and
   a scent distribution module positioned in the internal chamber configured to force a target scent from the internal chamber through the one or more openings in the substantially vertical surface of the elevated section to create a scent curtain that is directed laterally across the access opening above the food item which can be disposed in the trough.

2. The scent training device of claim 1, wherein the elevated section comprises a portion of the outer sidewall that is adjacent to the access opening.

3. The scent training device of claim 1, wherein the feeding dish comprises a raised central member extending from the bottom surface, and wherein the elevated section comprises a portion of the raised central member that is adjacent to the access opening.

4. The scent training device of claim 1, wherein the scent distribution module comprises:
   a scent tray configured to retain a target scent source material therein, wherein the scent tray includes a plurality of apertures extending through one or more surfaces of the scent tray; and
   a fan positioned in proximity to the scent tray so as to force air through the scent tray.

5. The scent training device of claim 4, wherein the base member includes an air intake opening, and wherein the fan is positioned between the air intake opening and the scent tray so as to draw air through the air intake opening and force the air drawn through the air intake opening through the scent tray.

6. The scent training device of claim 4, further comprising:
   a rechargeable power source positioned in the internal cavity to deliver power to the fan.

7. The scent training device of claim 4, wherein the scent tray is configured to retain the target scent source material therein, wherein the target scent source material is associated with at least one of a narcotic scent, an explosives scent, a chemical and biological agent scent, a currency scent, a foodstuff scent, an insect scent, or a cancer cell scent.

8. The scent training device of claim 1, further comprising: an alternating current (AC) to direct current (DC) (AC/DC) converter connected to a power cord.

9. The scent training device of claim 1, wherein the internal chamber is substantially sealed to create a pressure differential between the internal chamber and an outside environment.

10. The scent training device of claim 1, wherein the base member is detachably secured to the feeding dish.

11. The scent training device of claim 1, further comprising:
a module configured to wirelessly communicate with a remote control that enables a user to remotely activate the scent distribution module positioned in the internal chamber to force the target scent from the internal chamber through the one or more openings in the elevated section.

12. An apparatus, comprising:
a feeding dish configured to retain a food item therein, wherein the feeding dish defines a trough and an access opening;
a base member positioned to below the feeding dish to define an internal chamber between the feeding dish and the base member;
an elevated section comprising a substantially vertical surface extending above the trough and having one or more openings extending through the substantially vertical surface from the internal chamber to the feeding dish; and
a scent distribution module positioned in the internal chamber, comprising:
a scent tray configured to retain a target scent source material therein, and
a ventilated fan positioned in proximity to the scent tray so as to force air through the scent tray and out of the internal chamber through the one or more openings in the substantially vertical surface of the elevated section in a direction that is substantially parallel to and above contents of the through.

13. The apparatus of claim 12, wherein the elevated section comprises a portion of an outer sidewall of the feeding dish that is adjacent to the access opening.

14. The apparatus of claim 12, wherein the feeding dish comprises a raised central member extending from the bottom surface, and wherein the elevated section comprises a portion of the raised central member that is adjacent to the access opening.

15. The apparatus of claim 12, wherein the base member includes an air intake opening, and wherein the fan is positioned between the air intake opening and the scent tray so as to draw air through the air intake opening and force the air drawn through the air intake opening through the scent tray.

16. The apparatus of claim 12, further comprising:
a power source positioned in the internal cavity to deliver power to the fan.

17. The apparatus of claim 16, wherein the power source is a rechargeable battery pack.

18. The apparatus of claim 12, wherein the internal chamber is substantially sealed to create a pressure differential between the internal chamber and an outside environment.

19. The apparatus of claim 12, wherein the base member is detachably secured to the feeding dish.

20. The apparatus of claim 12, further comprising:
a module configured to wirelessly communicate with a remote control that enables a user to remotely activate the scent distribution module positioned in the internal chamber.

* * * * *